US 6,702,026 B2

(12) United States Patent
Allen et al.

(10) Patent No.: US 6,702,026 B2
(45) Date of Patent: *Mar. 9, 2004

(54) METHODS AND SYSTEMS FOR REDUCING DRAG AND VORTEX-INDUCED VIBRATIONS ON CYLINDRICAL STRUCTURES

(75) Inventors: Donald Wayne Allen, Richmond, TX (US); Dean Leroy Henning, Needville, TX (US); Richard Bruce McDaniel, Houston, TX (US); David Wayne McMillan, Houston, TX (US); Kenneth Dupal, Mandeville, LA (US)

(73) Assignee: Shell Oil Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/845,678

(22) Filed: Apr. 29, 2001

(65) Prior Publication Data
US 2002/0146287 A1 Oct. 10, 2002

Related U.S. Application Data

(63) Continuation-in-part of application No. 09/625,893, filed on Jul. 26, 2000.

(51) Int. Cl.[7] .................. E21B 17/01; E21B 31/00; E02D 5/56
(52) U.S. Cl. .................. 166/367; 405/211; 405/212; 405/216; 114/243
(58) Field of Search ............... 405/211, 212, 405/195.1, 216; 166/367; 114/243; 254/412, 416, 404

(56) References Cited

U.S. PATENT DOCUMENTS 3,581,449 A * 6/1971 Huber
4,073,983 A * 2/1978 Van Cleave
4,398,487 A * 8/1983 Ortloff et al.
4,470,722 A * 9/1984 Gregory
6,048,136 A * 4/2000 Denison et al.
6,148,751 A * 11/2000 Brown et al.
6,206,614 B1 * 3/2001 Blevins et al.
6,571,878 B2 * 6/2003 Mc Daniel et al. ......... 166/367

FOREIGN PATENT DOCUMENTS

WO   WO 98/27373   * 6/1998 ............. F16L/1/24

OTHER PUBLICATIONS

Graham, Flow Past a Cylinder, 4 pages, downloaded from http://astron.berkeley.edu/~jrg/ay202/lectures/node18.html.*
Mikolaitis, Univeristy of Florida, Friction Factor Calculator, 1 page, downloaded from http://grumpy.aero.ufl.edu/gasdynamics/colebrook10.html.*
Vortex Shedding behind a circular cylinder, 4 pages, downloaded from http://www.sintef.no/nhl/vass/cylinder.html.*
Sellens, MECH 441, Losses in Piping, 4 pages, Revised Sep. 9, 1996, downloaded from http://sellensr.me.queensu.ca/sellens/441/losses.htm.*
CE/ME 101abc, Handout#5: Incompressible Flow over a Circular Cylinder (no author listed) 5 pages, photos dated 1982. Downloaded from http://green.caltech.edu/~colonius/me101/ho5/ho5.html.*

(List continued on next page.)

Primary Examiner—J. J. Swann
Assistant Examiner—Katherine Mitchell
(74) Attorney, Agent, or Firm—Gilbreth & Associates P.C.; J. M. (Mark) Gilbreth; Mary A. Gilbreth

(57) ABSTRACT

Apparatus for controlling drag and vortex-induced vibration exerted onto a substantially cylindrical element of a fixed position subjected to a fluid flowing environment. Apparatus of the invention comprise a sleeve comprising an ultra-smooth surface. Methods for installing such apparatus onto cylindrical elements, and systems for controlling drag and vortex-induced vibrations in which a substantially cylindrical marine element has an ultra-smooth effective surface.

20 Claims, 9 Drawing Sheets

OTHER PUBLICATIONS

Masad, Transition Prediciton in Flow of Roughness Elements, 2 pages, downloaded from http://sti.larc.nasa.gov/randt/1994/3–SectionB1.www38.html.*

Drag of Blunt Bodies and Streamlined Bodies (no author listed) 4 pages, downloaded from http://www.princeton.edu/~asmits/Bicycle_web/blunt.html, posted on internet Jul. 24, 1997.*

Robertson and Crowe, Engineering Fluid Mechanics, 5th Ed., Houghton Mifflin Co, ©1993, chapter 10, pp. 428–429.*

Every et al., "Vortex–ExcitedVibrations of Cylinders and Cables and their Suppression", Ocean Engng, Vol 9, No. 2, pp 135–157; © Pergamon Press Ltd. 1982.*

D.W.Allen and D.L. Henning, Vortex–Induced Test of a Flexible Smooth Cylinder at Supercritical Reynolds Numbers, dated May 1997.*

* cited by examiner

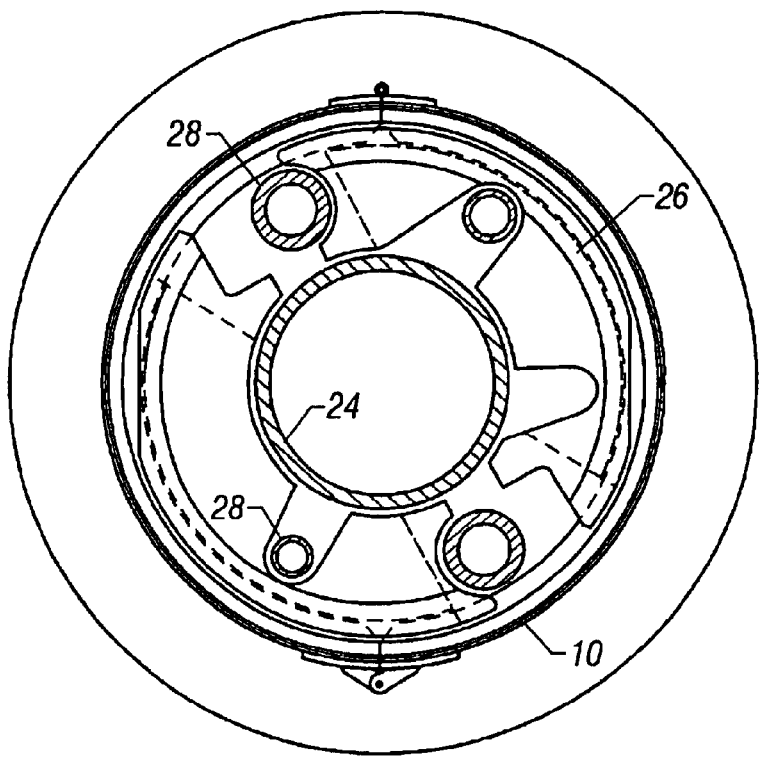
FIG. 6
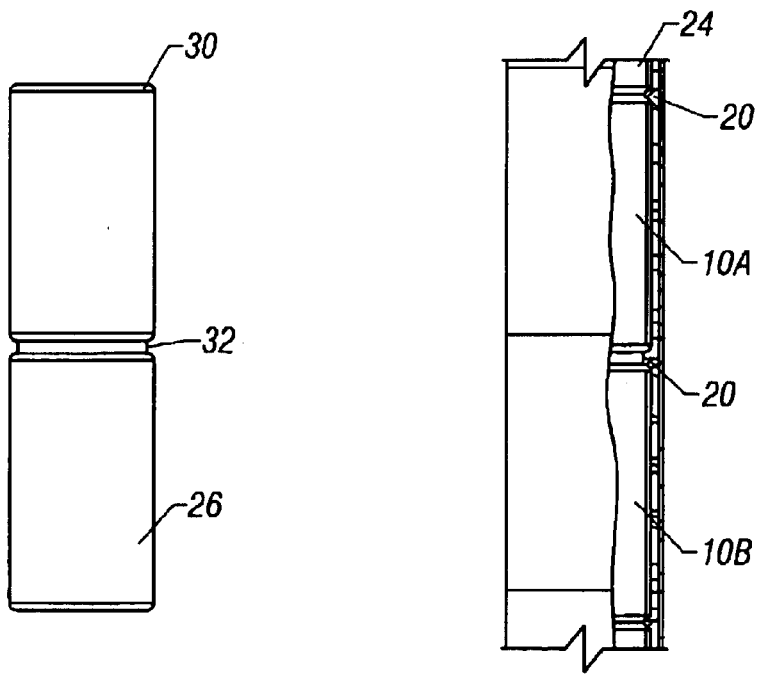
FIG. 7          FIG. 8

METHODS AND SYSTEMS FOR REDUCING DRAG AND VORTEX-INDUCED VIBRATIONS ON CYLINDRICAL STRUCTURES

RELATED APPLICATION DATA

This application is a continuation-in-part of copending U.S. patent application Ser. No. 09/625,893 filed Jul. 26, 2000.

BACKGROUND OF THE INVENTION

1. Field of the Invention

The present invention relates to apparatus, methods and systems for increasing performance and stability of fixed cylindrical elements subjected to flowing fluid environments. In another aspect, the present invention relates to apparatus, methods and systems for reducing drag and vortex-induced vibrations (VIV) on cylindrical elements in marine environments.

2. Description of the Related Art

Production of oil and gas from offshore fields has created many unique engineering challenges. These challenges include dealing with the effects of ocean currents on fixed cylindrical marine elements, and dealing with the effects of wind currents on fixed cylindrical elements exposed to the atmosphere.

With respect to fixed cylindrical marine elements, these elements are used in a variety of applications, and include subsea pipelines; drilling, production, import and export risers; tendons for tension leg platforms; legs for traditional fixed and for compliant platforms; space-frame members for platforms; cables; umbilicals; mooring elements for deep-water platforms; and the hull and/or column structure for tension leg platforms (TLPs) and for spar type structures. Ocean currents produce drag on the cylindrical marine elements and cause vortexes to shed from the sides of the elements, thereby inducing drag forces and vibrations that can lead to the failure of the elements. The large drag forces result in increased mooring or station keeping costs, and impose constraints on what kinds of systems are workable in a given environment (due to stress limitations, top angle limitation while drilling, etc.). Large vibrations (primarily vortex-induced vibrations) cause substantial increases in mean and dynamic drag forces, and also cause dynamic motions that result in premature fatigue failures of structural members. In addition, the presence of ocean currents can cause interference between adjacent structures.

Numerous attempts have been made in the art to overcome the above set of issues. One such attempt involves the use of helical strakes. Unfortunately, helical strakes are not effective at reducing drag, and are therefore rarely used in situations in which drag reduction is important (e.g. drilling risers). Another attempt to improve performance and stability of cylindrical marine elements is the use of fairings. However, there are many instances in which the use of fairings is impractical and/or uneconomical. For example, fairings are typically quite large and quite expensive, can be very difficult to handle, and generate large installation costs.

In spite of advancements in the art, there is a need for apparatus, methods and systems for maximizing the performance and stability of cylindrical marine elements. There is another need for apparatus useful for reducing ocean current-induced drag force and vibrations on cylindrical marine elements. There is even another need for methods of installing such apparatus onto cylindrical elements. There is still another need for systems for reducing ocean current-induced drag force and vibrations on cylindrical marine elements.

These and other needs will become apparent to those of skill in the art upon review of this specification, including its drawings, claims and appendix.

SUMMARY OF THE INVENTION

It is an object of the present invention to provide apparatus useful for reducing ocean current-induced drag force and vibrations on cylindrical marine elements.

It is another object of the present invention to provide methods of installing such apparatus onto cylindrical elements.

It is even another object of the present invention to provide systems for reducing ocean current-induced drag force and vibrations on cylindrical marine elements.

One embodiment of the present invention is directed to an apparatus for reducing drag and vortex-induced vibrations on cylindrical marine elements. Generally the apparatus have a substantially cylindrical shape and comprise an interior surface and an exterior surface, wherein the exterior surface has a roughness parameter K/D of a value of about $1.0 \times 10^{-4}$ or less, wherein K is an averaged value of the distance between the peaks and troughs on the exterior surface, and D is the diameter of the apparatus.

Another embodiment of the present invention is directed to methods for controlling drag force and vortex-induced vibration on a substantially cylindrical element by providing an ultra-smooth surface about the cylindrical element. In general, the methods comprise the steps of: a) positioning a sleeve around a cylindrical element, wherein the sleeve covers from about 180 degrees to about 360 degrees of the circumference of the element; and b) securing the sleeve in position around the circumference of the element. In keeping with the sleeves of the invention, the sleeves used in the present methods have a K/D value of about $1.0 \times 10^{-4}$ or less.

Even another embodiment of the present invention is directed to systems for reducing the effects of drag and vortex-induced vibration on fixed cylindrical structures utilized in offshore operations. Generally the systems of the invention comprises a substantially cylindrical marine element and a substantially cylindrical sleeve, wherein the sleeve is secured in place around the circumference of the element. Generally the sleeve covers from about 180 degrees to about 360 degrees of the circumference of the marine element, preferably about 200 degrees to about 360 degrees, more preferably about 220 degrees to about 360 degrees, and most preferably about 240 degrees to about 360 degrees.

These and other embodiments of the present invention will become apparent to those of skill in the art upon review of this specification, including its drawings, appendix, and claims.

BRIEF DESCRIPTION OF THE DRAWINGS

FIG. 6 is a top elevational view of an installed sleeve.

FIG. 7 is a side elevational view of a drilling riser.

FIG. 8 is a side elevational view of a sleeve installed on a drilling riser.

DETAILED DESCRIPTION OF THE INVENTION

Figure 1:
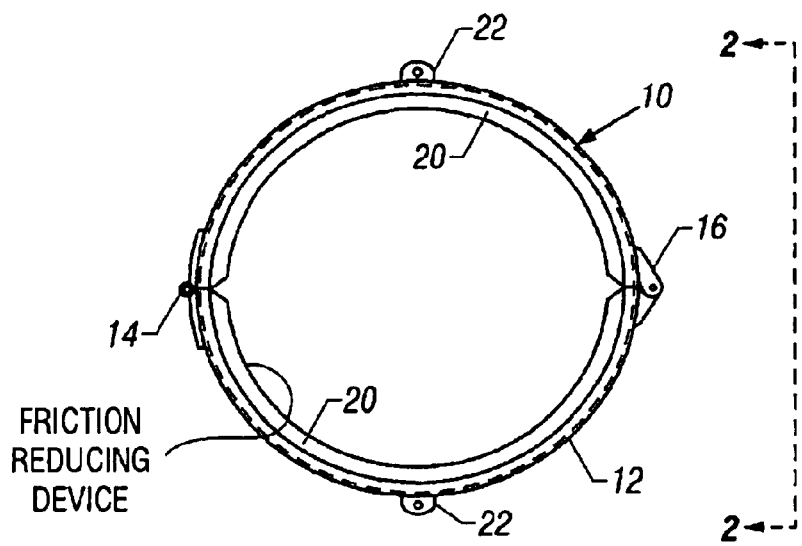
FIG. 1 is a top elevational view of one embodiment of the invention formed sleeve.

One embodiment of the present invention is directed to systems for reducing the effects of drag and vortex-induced vibration on fixed cylindrical structures during offshore operations. Generally the systems of the invention comprise a substantially cylindrical marine element and a substantially cylindrical sleeve, wherein the sleeve is secured in place around the circumference of the element. Generally the sleeve covers from about 180 degrees to about 360 degrees of the circumference of the marine element, preferably about 200 degrees to about 360 degrees, more preferably about 220 degrees to about 360 degrees, and most preferably about 240 degrees to about 360 degrees.

The sleeves of the system comprises an ultra-smooth exterior surface. The exterior surface has a roughness parameter K/D, wherein K is an averaged value of the distance between the peaks and troughs on the exterior surface of the ultra-smooth surface, and D is the outer diameter of the sleeve covering the marine element. The K/D has a value of about $1.0 \times 10^{-4}$ or less, indicating the exterior surface of the sleeve is extremely smooth. The relationship between surface roughness/smoothness, K/D values, and their effects on current-induced drag force and vibration are discussed further in Example 1 of the Examples section, and also in D. W. Allen and D. L. Henning, 2001 Offshore Technology Conference (OTC) Paper #13302, entitled "Surface Roughness Effects on Vortex-Induced Vibration of Cylindrical Structures at Critical and Supercritical Reynolds Numbers," incorporated herein by reference.

Although the length of the sleeves utilized herein are not restricted in size and may be of any size reasonable for the specific application, generally the length of the sleeve is less than the length of the marine element.

The cylindrical marine element of the present invention may be any one selected from the group consisting of subsea pipelines, drilling risers, production risers, import and export risers, tendons for tension leg platforms, legs for traditional fixed and for compliant platforms, space-frame members for platforms, cables, umbilicals, mooring elements for deepwater platforms, hull structures for tension leg platforms (TLPs) and for spar type structures, and column structures for tension leg platforms (TLPs) and for spar type structures.

The sleeves of the invention may comprise one or more members. Examples of two-membered sleeves suitable herein include a clam-shell structure wherein the sleeve comprises two members that are hinged to one another to form a hinged edge and two unhinged edges, as well as a sleeve comprising two members that are connected to one another after being positioned around the circumference of the marine element. Optionally, friction-reducing devices may be attached to the interior surface of the sleeve.

Another embodiment of the invention is directed to methods of installing an ultra-smooth sleeve around a substantially cylindrical element. Generally the methods comprise: positioning a sleeve having a top, a bottom, an interior surface and an exterior surface, around a cylindrical element having a top, a bottom, a length, and a circumference, wherein the sleeve covers from about 180 degrees to about 360 degrees of the circumference of the element; and securing the sleeve in position around the circumference of the element. In keeping with the sleeves of the invention, the sleeves used in the present methods have a K/D value of about $1.0 \times 10^{-4}$ or less.

Clam-shell sleeves may be positioned onto the marine element by opening the clam shell structure, placing the structure around the element, and closing the clam-shell structure around the circumference of the element. The step of securing the sleeve into position around the element may comprise connecting the two members to one another. For example, the sleeve may be secured around the element by connecting the two unhinged edges of the clam shell structure to one another. Any connecting or fastening device known in the art may be used to connect the member to one another.

The methods and systems of the invention may further comprise modifying the buoyancy of the sleeve. This may be carried out by attaching a weight or a buoyancy module to the sleeve.

The methods and systems of the invention may further comprise positioning a second sleeve, or a plurality of sleeves around the circumference of an element. In the multi-sleeve embodiments, the sleeves are adjacent one another on the element, or stacked on the element. The sleeves may comprise end flanges, rings or strips to allow the sleeves to easily stack onto one another. IN addition the sleeves may be added to the element one at a time, or they may be stacked atop one another prior to being placed around/onto the element. Further, the sleeves of a stack of sleeves may be connected to one another.

Figure 2:
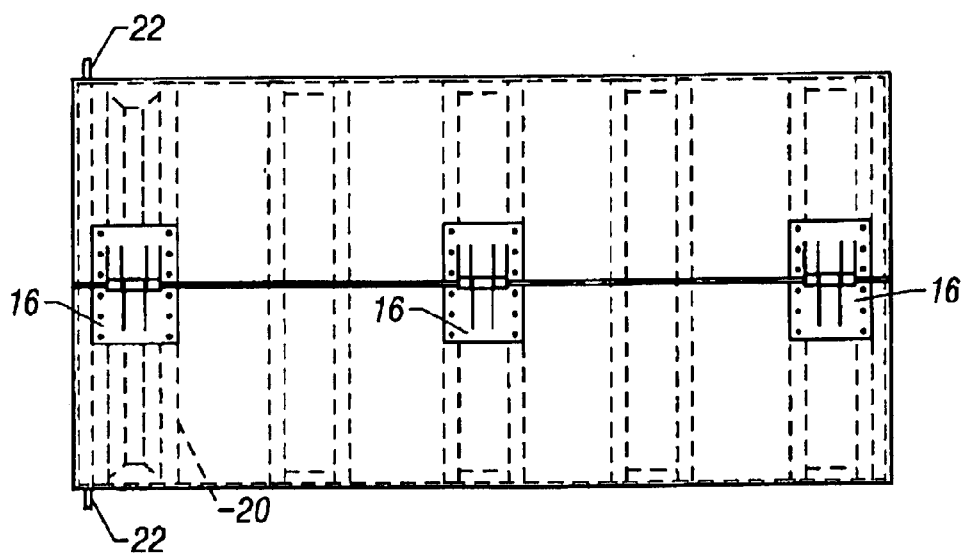
FIG. 2 is a side elevational view of the sleeve of FIG. 1, taken at line 2—2 in FIG. 1.
Figure 3:
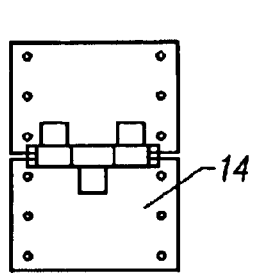
FIG. 3 is side elevational view of a hinge of FIG. 1.
Figure 4:
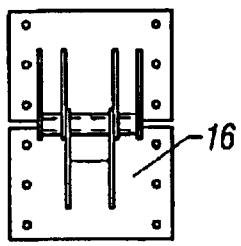
FIG. 4 is a side elevational view of a latch of FIG. 1.
Figure 5:
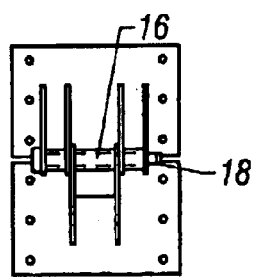
FIG. 5 is a side elevational view of a secured latch.

FIGS. 1 and 2 illustrate a substantially cylindrical sleeve 10 presenting an ultra-smooth surface 12. Here the sleeve is a clam-shell design formed of fiberglass with a gel-coat presenting ultra-smooth surface 12. Opposing sides of the clam-shell are secured with hinges 14 and connectors such as latches 16 which may be secured with a hairpin 18 in one embodiment of the present invention. See FIGS. 3–5. Lifting provisions may be conveniently provided with lifting eyes 22. Ribs 20 provide some strength to the sleeve 10 and may be formed to axially secure the sleeve about riser sections.

FIG. 6 illustrates sleeve 10 secured about axially cross sectioned drilling riser 24. A dotted outline also illustrates the diameter of the rotary on the offshore platform. Even though the sleeve is configured to encircle a drilling riser 24, its buoyancy modules 26, and attendant control lines 28, it remains sufficiently narrow to pass through the rotary so that installation and removal can be accomplished above the rotary.

In this embodiment, it is desired for sleeves 10 to have a substantially shorter length than that of buoyancy module 26 and an additional groove 32 is formed in the outer circumference of the buoyancy module. See FIG. 7. Ribs 20 on the inside of the sleeve sections engage the top 30 of the buoyancy module or the groove, respectively. See sleeve sections 10A and 10B in FIG. 8.

Figure 9:
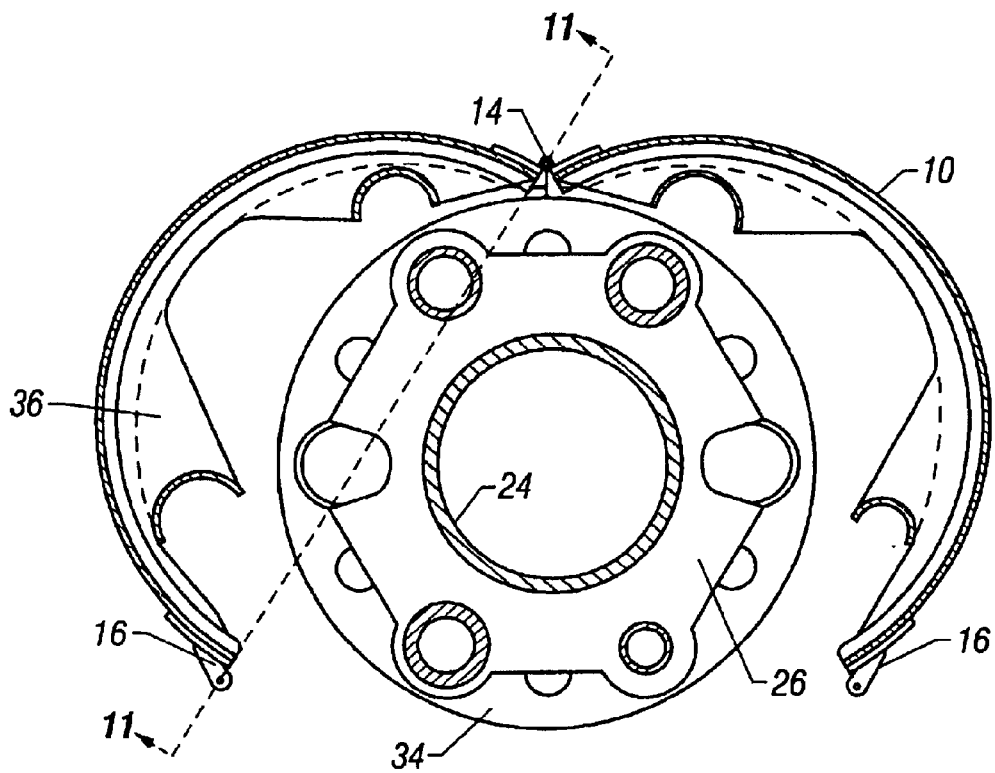
FIG. 9 is a cross sectional top view of a sleeve being installed about a riser.
Figure 10:
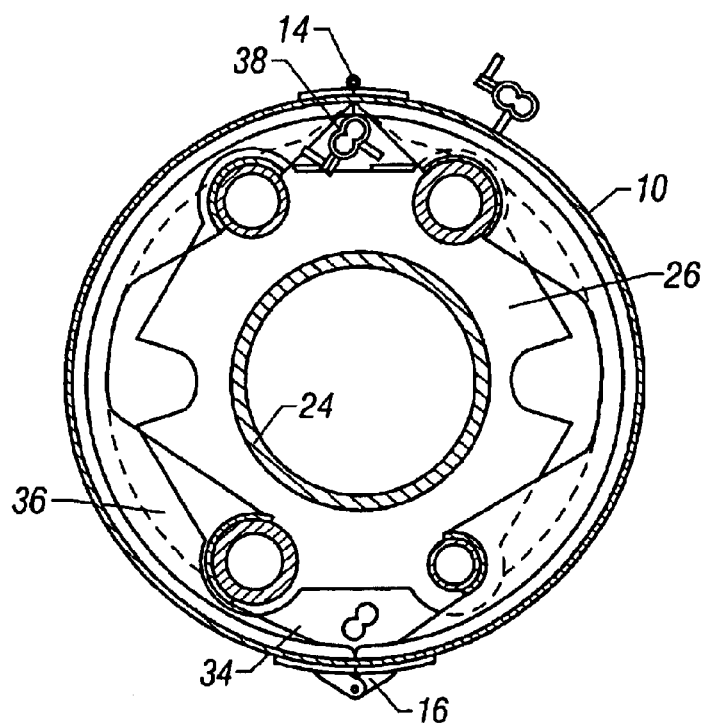
FIG. 10 is a cross sectional top view of the sleeve of FIG. 9 now installed about a drilling riser.
Figure 11:
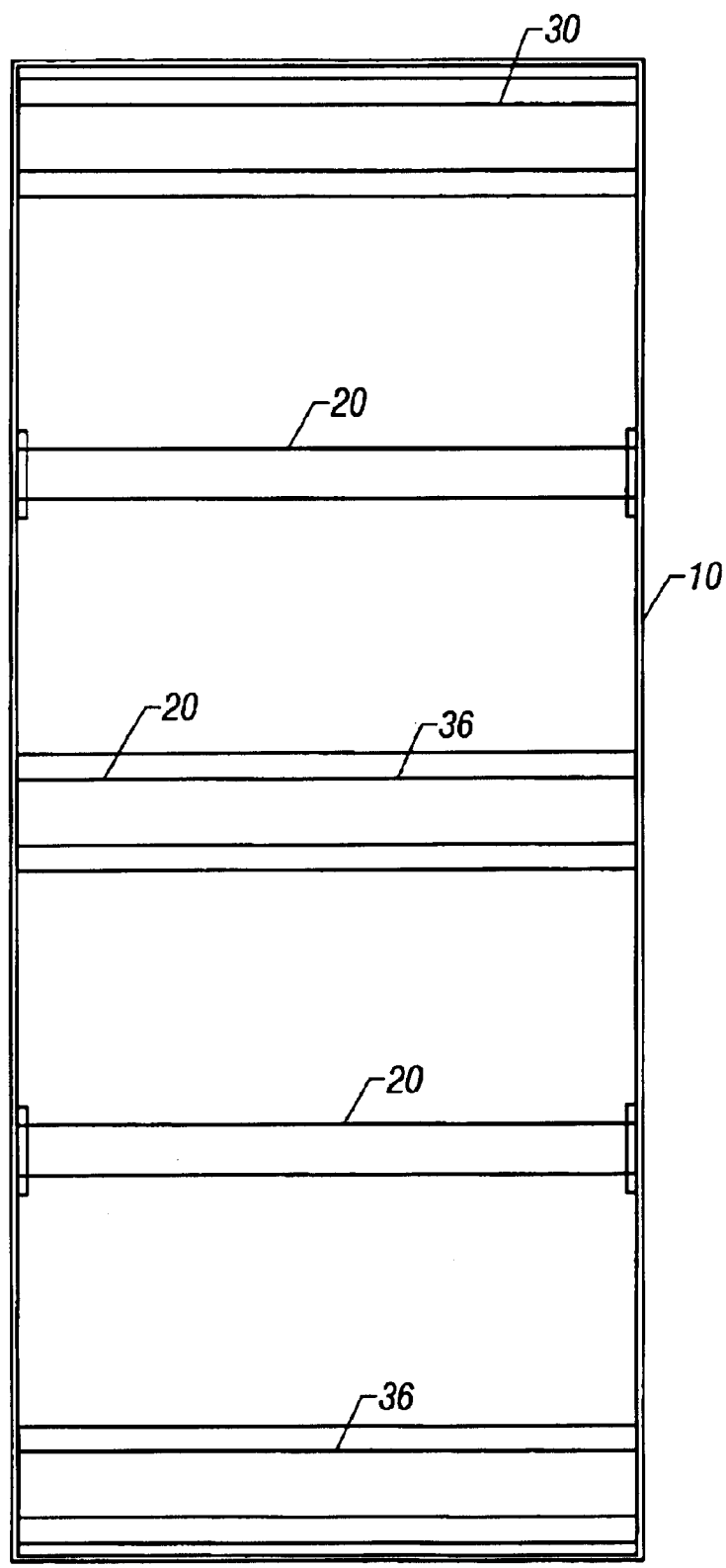
FIG. 11 is a cross sectional side view taken at line 11—11 in FIG. 9 (from which the riser, centralizers and control lines have been removed for simplification).

FIGS. 9–11 illustrate another embodiment. Here drilling riser 24 is afforded buoyancy modules 26 at intervals and the control lines 28 are surround intermittently with riser centralizers 34. Note how ribs 20 are provided seats 36 to form around the control lines/buoyancy modules and to rest on centralizers 34. FIGS. 9 and 10 illustrate sleeve installation with the clam-shell capture of the drilling riser. Note also that the standoff of mud line 38 folds to a position within sleeve 10.

Figure 12:
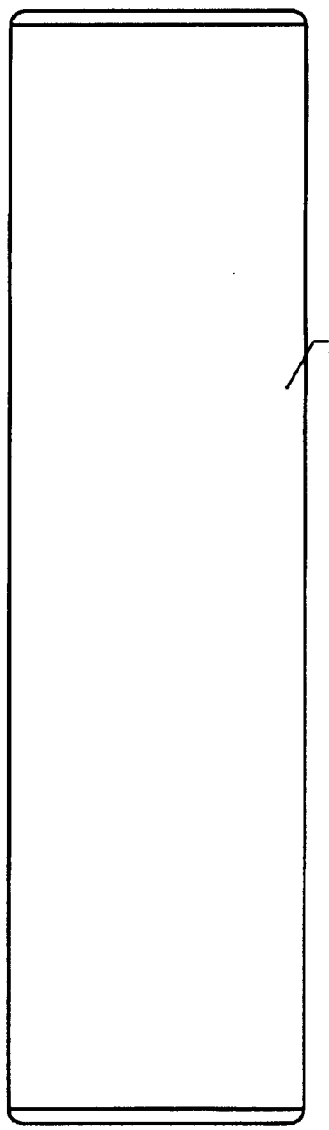
FIG. 12 is a side elevational view of a drilling riser section.
Figure 13:
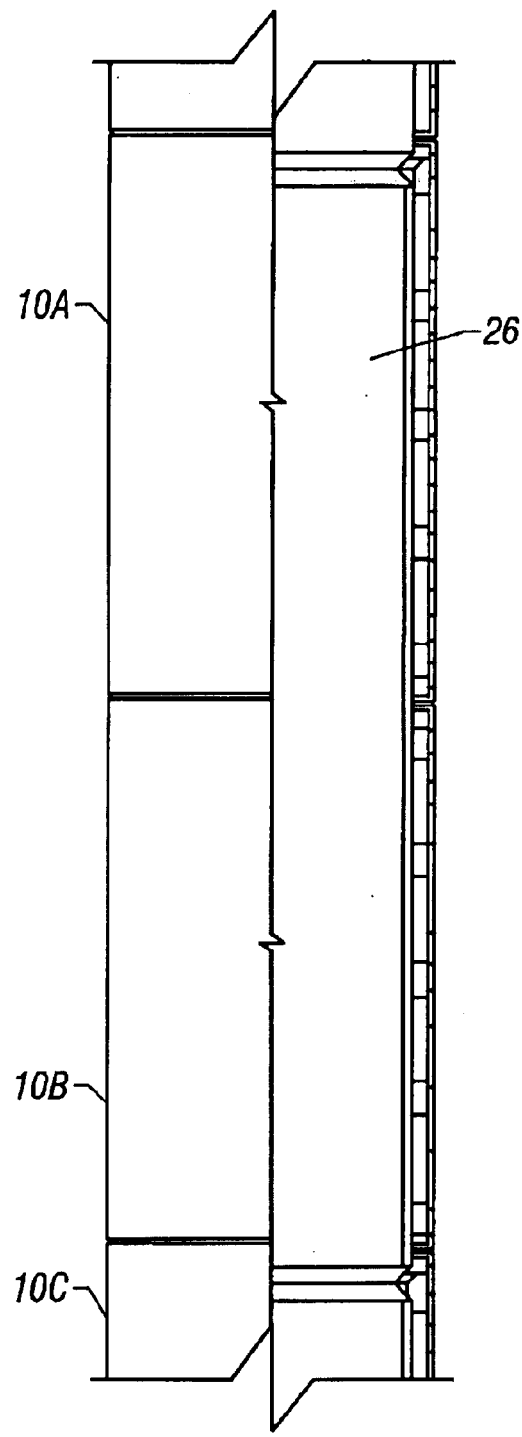
FIG. 13 is a side elevational view of an alternate embodiment of a sleeve installed about the riser.

FIGS. 12–13 illustrate another embodiment, here for using half length sleeve sections 10 with full length buoyancy modules 26. In this instance two types of sleeve sections are used, hanging sleeve 10A and stacking sleeve 10B. The hanging sleeve engages to the top surface of the buoyancy module and any centralizer presented there. Whereas the stacking sleeve 10B can be configured to engage to the bottom of hanging sleeve 10A or to rest on top of the next lower hanging sleeve 10C and the ribs are configured accordingly. See FIG. 13.

Figure 14:
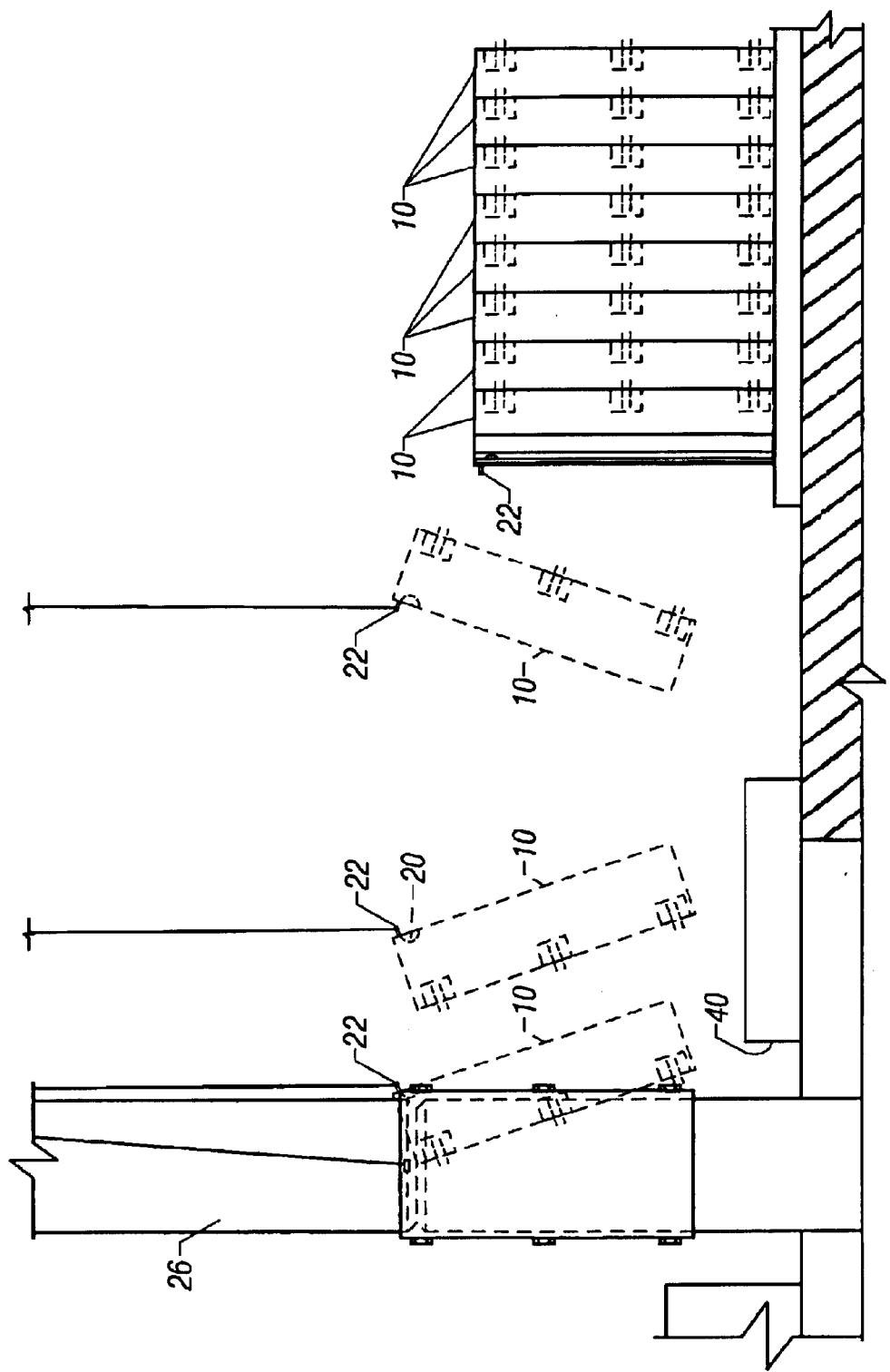
FIG. 14 is a side elevational "movie" view of sleeve handling procedures.

FIG. 14 illustrates one option for sleeve handling. It is a "movie" of running sleeves 10 on cables 42 operated by a crane (not shown). The assembly/disassembly operation (see FIGS. 9 and 10) is conducted above rotary opening 40. This greatly simplifies handling and storage of the sleeve sections.

Another possibility facilitated by overall dimensions that can pass through the rotary is installing the sleeve sections on an installed drilling riser. In this embodiment the sleeve is near neutrally buoyant, made up above the rotary, lowered to the ocean surface and released. The ribs, if any, are configured to allow easy sliding of the sleeve and an array of sleeves is stacked, one on another, as concentrically symmetrical sleeves slide along the drilling riser.

Alternatively, the sleeve sections may be installed below the rotary, whether installed at the time of riser deployment or installed later.

To facilitate the installation of a sleeve wherein the sleeve is installed over the top of a marine element and slid down the element, devices that reduce friction such as, bearings, rollers, or any of the others well known in the art, may be attached to the inner surface of the sleeve, thus reducing the friction between the sleeve and the element and thereby allowing the sleeve to more easily slide down the riser.

To prevent the sleeve from migrating up or down the marine element around which it is placed, any full or partial collar known in the art may be installed above the top of a sleeve or a stack or sleeves, below the bottom of a sleeve or a stack of sleeves, or both. This placement of the collar prevents axial movement of the sleeve or sleeves along the element. The collar may be placed on the element before or after a sleeve is placed on the element. In a preferred embodiment, a collar is positioned on an element first, then a sleeve is positioned on the element.

The sleeves may also be held in place by a mooring system. The mooring system may include the use of cables, rope, chain, and/or any other useful mechanical mooring means known in the art.

In addition, the interior sleeve and the marine element may be connectable to one another.

Although the illustrated examples use ultra-smooth surfaces comprising gel-coated fiberglass, the ultra-smooth surfaces of the invention may be provided by sleeves comprising copper (when inhibition of growth of marine life onto the smooth surface is required), carbon fiber, rubber, or any sufficiently smooth thermoplastic, metal alloy, or other material. The smooth surface may even be obtained by the surface finish on the outside of the cylindrical element or maintained by a ablative paint or other coating applied to the surface of the element. The sleeves of the invention may also comprise any anti-fouling protection known in the art.

If sleeves are used to present the substantially cylindrical ultra-smooth surface, there are a number of alternatives for constructing, attaching, and/or installing the sleeves. For instance, the sleeve may be clam-shelled around the cylindrical element using hinges and/or any other known holding/latching mechanisms such as, for example, snaps, straps, bolts, clamps, pins, or any other fasteners known in the art. Alternatively, the sleeves can be made with a continuous circumference and slid over a cylindrical element.

The sleeves of the invention generally cover from at least 180 degrees up to 360 degrees of the circumference of the element. For those sleeves which do not cover the entire circumference of the element, the region of the element not covered by the sleeve faces "downstream" relative the fluid current to which the element is exposed, the objective being to keep the ultra-smooth surface of the sleeve in contact with the current. Preferably the sleeves cover about 200 degrees to about 360 degrees of the circumference of the element, more preferably from about 220 degrees to about 360 degrees of the circumference of the element, most preferably from about 240 degrees to about 360 degrees of the circumference of the element.

Other alternatives for constructing a sleeve from one or more sections/members are also applicable herein. For instance, as an alternative to a sleeve comprising two halves, wherein each half covers an approximately equal portion of the circumference of the marine element, a C-shaped sleeve may be utilized. A C-shaped sleeve is one that covers more than 180 degrees of the circumference but less than 360 degrees of the circumference. The portion of the circumference that is not encompassed by the C-shaped sleeve may by enclosed by a second piece in order to fully cover the circumference of the element. The C-shaped sleeve can be clam-shelled around the cylindrical element using hinges and a latching mechanism, or can be slid down the length the structure.

Further, sleeves, or sleeve sections, covering all or part of the circumference, can be held in place using hardware that is attached to the cylindrical element itself and the sleeve. This hardware can include latches, receptacles for bolts, pins, rivets, screws, or other fasteners. Alternatively, a sleeve that consists of two or more parts, which make up the circumference, can be made such that the parts are held together by straps or banding materials. In this embodiment, grooves may be provided in the cylindrical element within which the strapping materials may be positioned. Further, the sleeves can be pre-installed, they can be installed on the cylindrical element during its installation (e.g. while running a drilling riser); or they can be installed after the cylindrical element has already been installed (a post-installation).

The ultra-smooth surfaces disclosed herein in which the K/D roughness parameter is less than about $1.0 \times 10^{-4}$, is a unique and critical feature of the present invention. The drag coefficient for flow past a cylinder sharply decreases as the Reynolds number is increased beyond about 200,000 (called the "critical" Reynolds number range) and then slowly recovers starting at Reymolds numbers in the range of about 600,000 to 800,000 (the lower end of the "supercritical" Reynolds number range). While it was recognized that surface roughness can affect the Reynolds number at which this "dip" occurs and can add to the drag coefficient, conventional wisdom held that cylindrical elements would experience substantial VIV accompanied by fairly large drag at critical and supercritical Reynolds number ranges.

But, surprisingly, with the present invention, it is discovered that a very smooth cylinder does not experience VIV in this Reynolds number range, and furthermore the very smooth cylinder experiences very low drag. Further, the "ultra-smooth" sleeve is effective in Reynolds number ranging from about 200,000 to over 1,500,000, perhaps more. In fact, benefits in the VIV and drag become evident starting at about a Reynolds number of about 100,000. The relationship of VIV and drag as a function of the level of surface roughness can be quantifiable as a dimensionless roughness parameter, K/D, where:

K is the average peak to trough distance of the surface roughness (e.g., as measured using confocal scanning with an electron microscope); and D is the effective outside diameter of the cylindrical element, including any sleeve or coating placed thereon.

Substantial reduction in VIV can be observed where K/D is less than about $1.0 \times 10^{-4}$ and most pronounced at about $1.0 \times 10^{-5}$ or less for fairly uniform roughness densities. A higher K/D ratio may allow for achieving the same results where the roughness density decreases.

Figure 15:
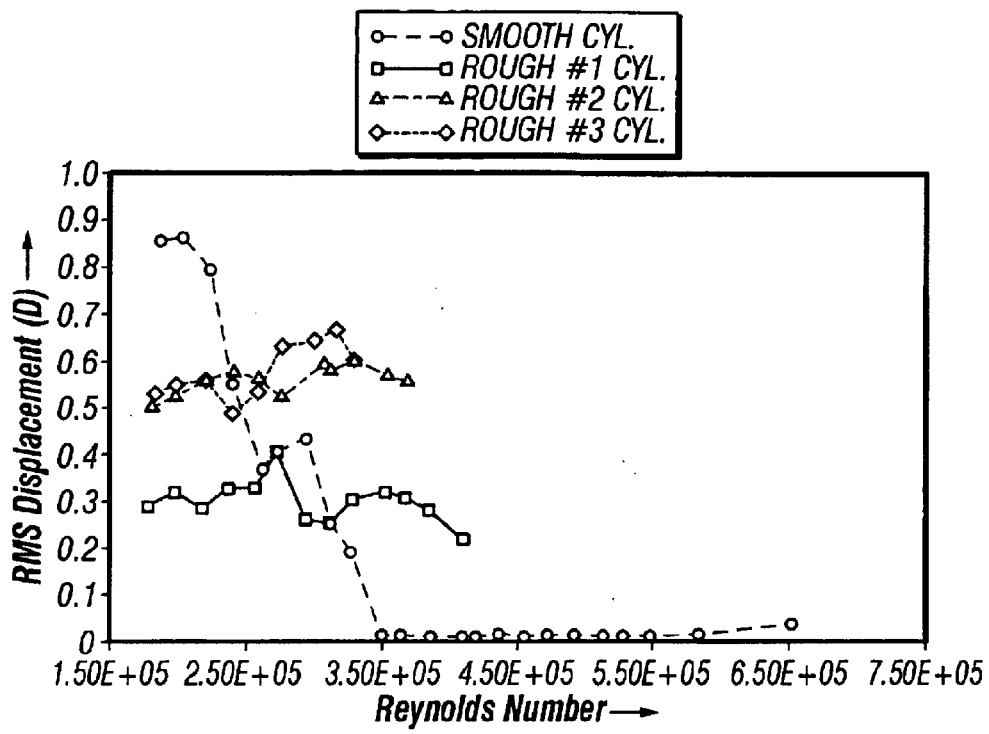
FIG. 15 is a graph of VIV as a function of Reynolds Number.
Figure 16:
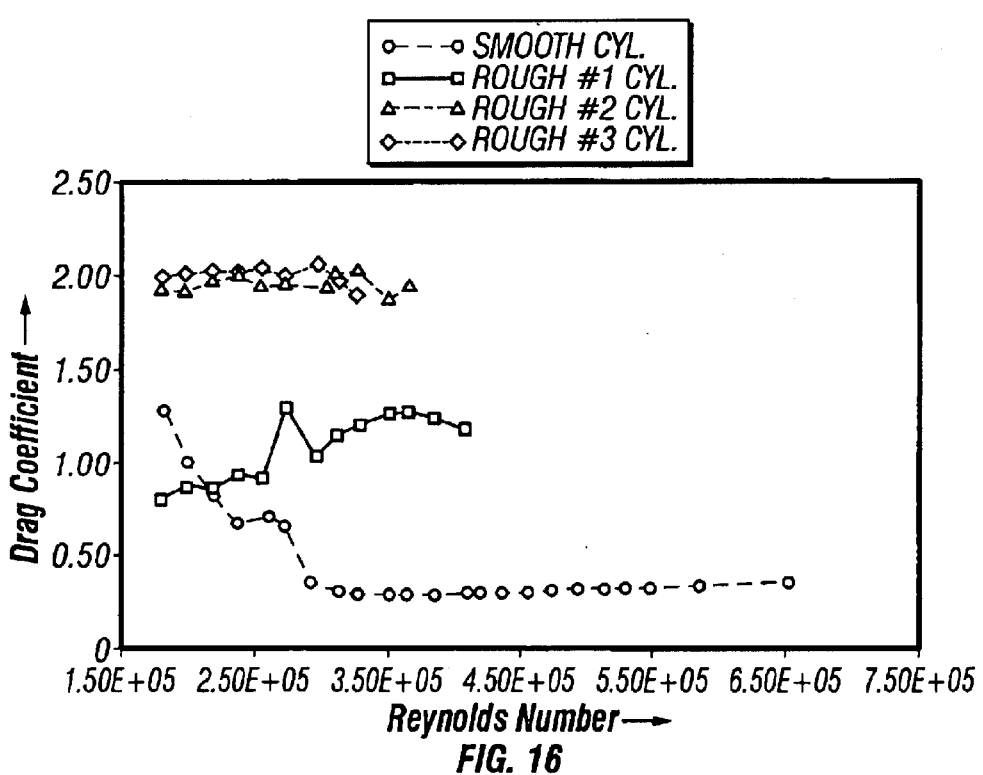
FIG. 16 is a graph of drag coefficient as a function of Reynolds Number.

FIGS. 15–16 illustrate test results demonstrating the surprising practicality and effectiveness of ultra-smooth surfaces of the invention. These tests were conducted in a tow tank environment with the marine element towed to develop relative motion between the test subject and the water. FIG. 15 illustrates transverse RMS displacement as a function of Reynolds number for an ultra-smooth cylinder and for relatively rough cylinders representing marine elements.

FIG. 16 illustrates drag coefficient as a function of Reynolds number for the same samples. The dimensionless roughness parameter K/D for these samples are:

ultra-smooth $5.1 \times 10^{-5}$
Rough #1 $1.9 \times 10^{-4}$
Rough #2 $2.5 \times 10^{-3}$
Rough #3 $5.8 \times 10^{-3}$ Improvement to both suppression of VIV excitement and drag is observed, and very pronounced as indicated by a K/D=$5.1 \times 10^{-5}$.

It should be appreciated that the present invention provides improvement in the ability to control both drag and VIV and beneficially impacts offshore operations. For instance, in drilling riser applications, down time due to ocean currents, including loop phenomena may be reduced or eliminated. On production risers, enhanced drag and VIV reduction allows for closer spacing of risers without interference problems. Further, the design of TLPs or spars in high current areas is impacted by eliminating, or reducing, the need for more expensive methods and devices.

Although the illustrative examples discussed herein are directed principally to drilling risers, the term "cylindrical marine element/member" as used herein includes, but is not limited to, subsea pipelines; production, import and export risers (catenary or not); tendons for tension leg platforms; legs for traditional fixed and for compliant platforms; spaceframe members for platforms; cables; umbilicals; other mooring elements for deepwater platforms; and hull and/or column structures for tension leg platforms (TLPs) or for spar type structures.

In addition to marine environments, the apparatus and methods of the present invention are applicable to long cylindrical structures in other flowing fluid environments, such as the atmosphere, in which current-induced drag and vortex-induced vibration forces are possible. The term "long cylindrical structure" includes, but is not limited to, industrial chimney stacks, aerospace structural members, large diameter power transmission lines, and bridge and tunnel support members.

EXAMPLES

The invention having been generally described, the following example is provided merely to illustrate certain embodiments of the invention. It is to be understood that the examples are not intended to limit the scope of the claims of the present invention, and should not be so interpreted.

Example 1

Effect of Surface Roughness on Current-induced Drag and Vibration.

Four different surface roughness levels were tested in the present example. These were:

a) smooth pipes which were obtained by grinding the outside diameter;

b) rough pipes that consisted simply of the pipes just after they were delivered by the fiberglass manufacturer (these are filament wound pipes) and were designated "rough #1";

c) rough pipes that were prepared by grinding the outside diameter and then gluing small ceramic macro-spheres to the surface (called "rough #2"); and d) rough pipes similar to those called "rough #2" but having larger macro-spheres glued to their surface (called "rough #3").

Below are the measured surface roughness levels for the various surfaces tested. These roughness levels were determined either by confocal image scanning (using a confocal laser microscope) or by combined use of the microscope and a hemispherical model of the roughness (used for the small and large macro-spheres).

Smooth Pipe: k=$1.272 \times 10^{-4}$=>k/D=$5.09 \times 10^{-5}$
Rough #1 Pipe: k=$4.846 \times 10^{-4}$=>k/D=$1.939 \times 10^{-4}$
Rough #2 Pipe: k=$6.233 \times 10^{-3}$=>k/D=$2.493 \times 10^{-3}$
Rough #3 Pipe: k=$1.455 \times 10^{-2}$=>k/D=$5.820 \times 10^{-3}$.

Confocal scanning provides an excellent way to determine surface roughness when the surface roughness is relatively homogeneous and the individual roughness elements (whether they be macro-spheres, scratches, etc.) are within the range of the microscope sample. In this case the microscope used one square centimeter samples. Since the largest macro spheres used in these tests (for the rough #3 pipe) ranged from 0.06 in. to 0.11 in. in diameter, a sufficient number of spheres were part of each sample. The scanner used herein performs an integration of the roughness over the sample area. This means that the K/D values reported herein might be quite different than those that would have been reported had the roughness been measured by other means. The K/D values from the scanner used herein are typically much smaller due to the averaging in of parts of the surface that do not have roughness elements on them. This is actually quite an advantage though, since this averaging technique allows the scanner to include the effects of the density of the roughness elements.

Figure 17:
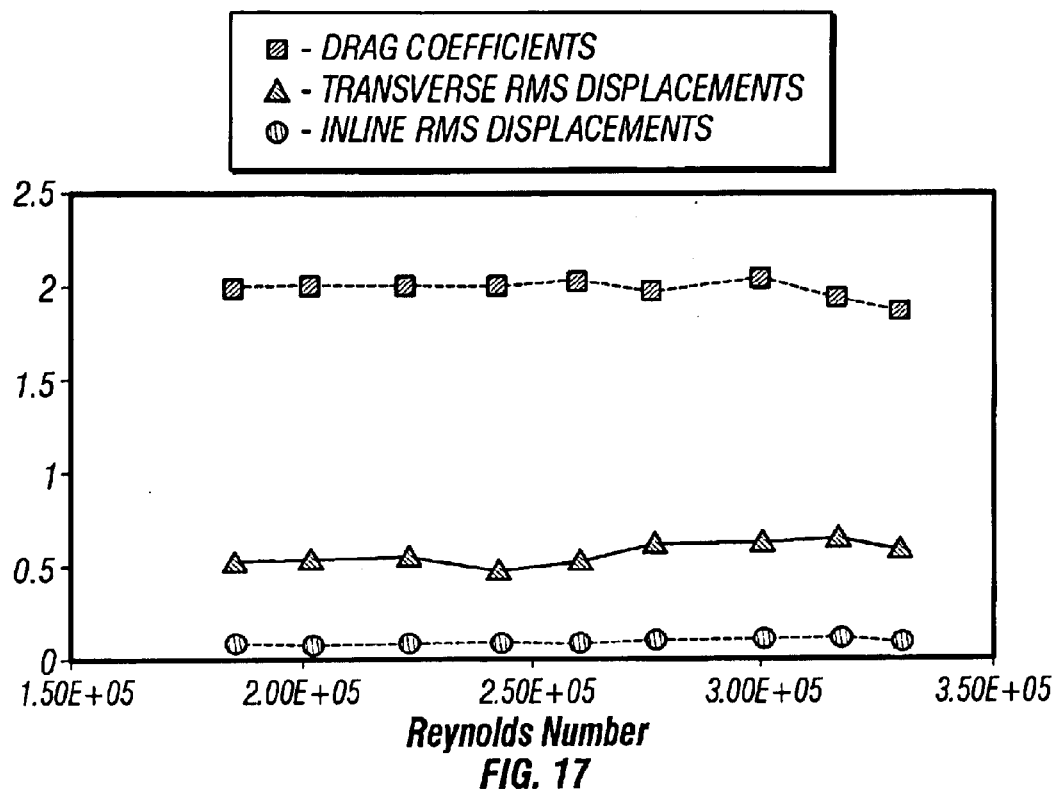
FIG. 17 is a graph showing root mean squared (rms) displacements and drag coefficients for a test cylinder designated Rough #3 test cylinder.

FIGS. 17–20 present the rms (root mean squared) displacements and drag coefficients for each of four surface roughness levels tested. FIG. 17 shows, at the highest roughness level, there is very little influence of Reynolds number on the results, with the exception of an increase in the displacements at the higher Reynolds numbers. However, it should be noted that the vibration changed from $2^{nd}$ to $3^{rd}$ mode just above a Reynolds number of $2.5 \times 10^5$, so that the anti-node of vibration was closer to the accelerometer location for the higher Reynolds numbers (no adjustments were made for mode shape in these results—the results are strictly from the accelerometer measurements).

Figure 18:
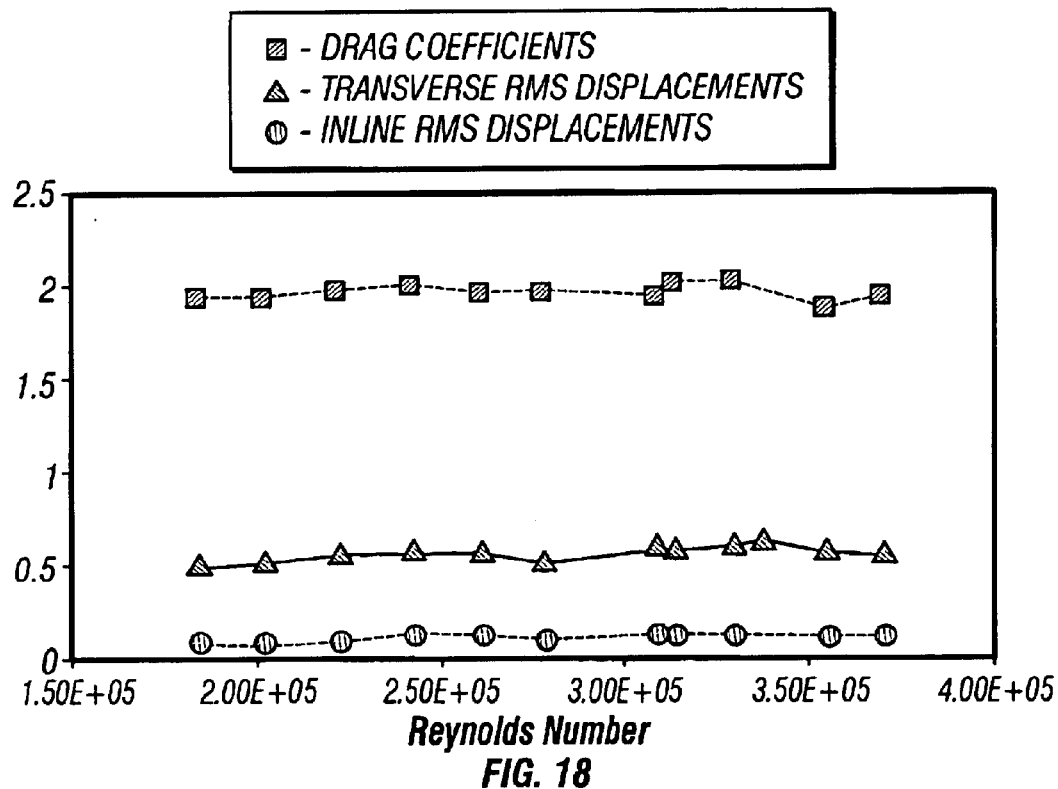
FIG. 18 is a graph showing root mean squared (rms) displacements and drag coefficients for a test cylinder designated Rough #2 test cylinder.

FIG. 18 presents results for the $2^{nd}$ highest roughness level and the results are very similar to those of FIG. 17. The reduced roughness level had very little influence over the results, with only a slight decrease in drag coefficient for most of the Reynolds numbers tested. This indicates that, at these roughness levels ($k/D=2.493 \times 10^{-3}$ and higher), additional surface roughness has little effect on the results (note that this is strictly true for only this type of surface roughness).

Figure 19:
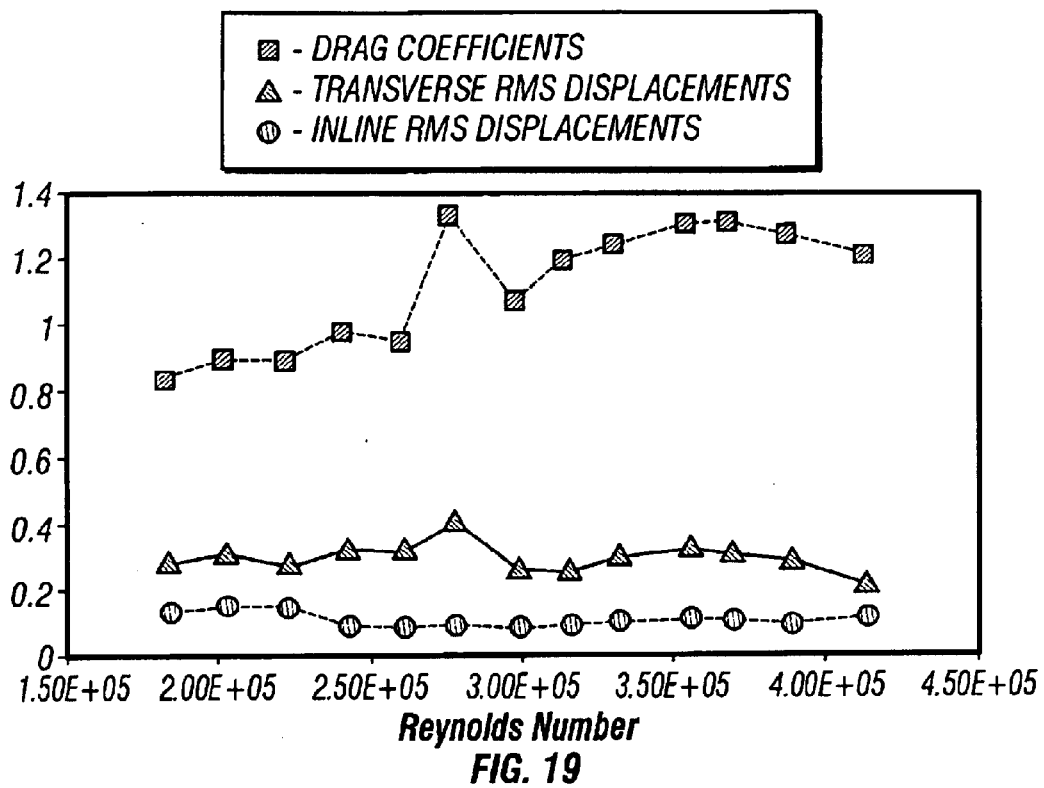
FIG. 19 is a graph showing root mean squared (rms) displacements and drag coefficients for a test cylinder designated Rough #1 test cylinder.

FIG. 19 reveals a dramatic difference when the roughness is reduced to $k/D=1.939 \times 10^{-4}$. The drag coefficients are about 35–55 percent lower than those in FIG. 6. The transverse rms displacements are also reduced almost as dramatically, most likely accounting for the majority of the drag force reductions.

Figure 20:
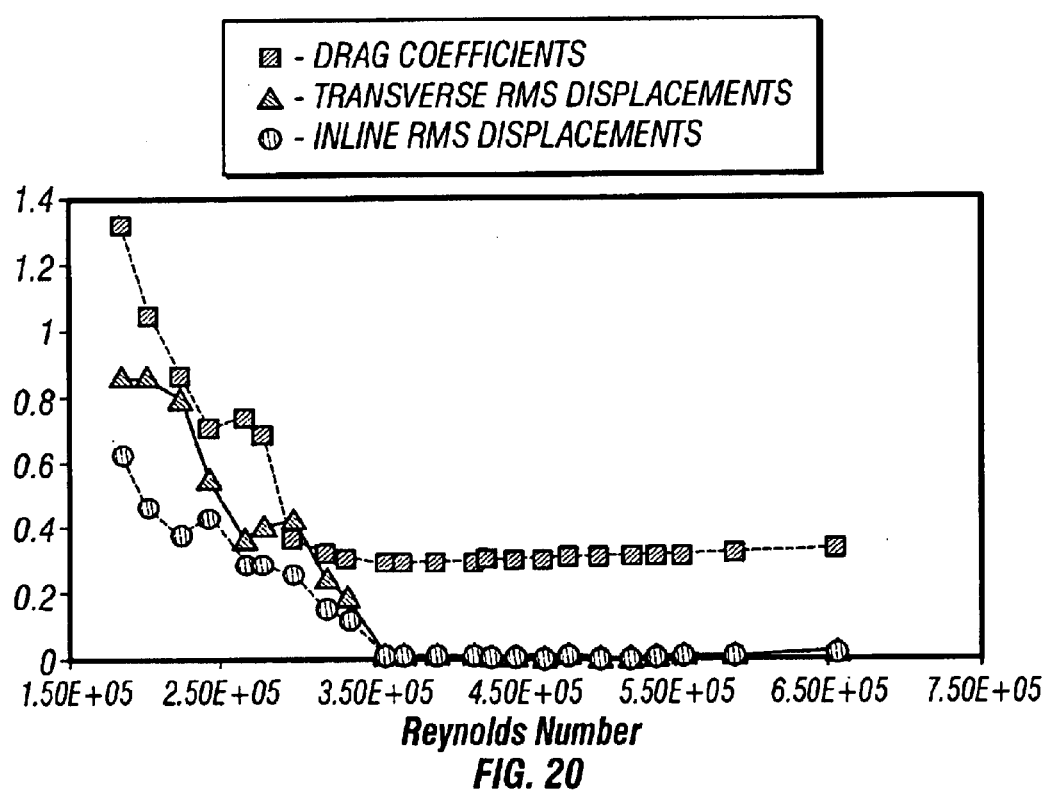
FIG. 20 is a graph showing root mean squared (rms) displacements and drag coefficients for a test cylinder designated Smooth test cylinder.

FIG. 20 reveals the most dramatic change of all. With a roughness level of $k/D=5.09 \times 10^{-5}$, the drag crisis eventually results in reductions of the displacements to less than 0.02 diameters (D). The drag coefficients are also reduced to about 0.3; values typical for a stationary smooth cylinder in this Reynolds number range. Note that the transverse displacement at the highest Reynolds number appears to have a small, but significant, increase over that at the next-to-highest Reynolds number. This is caused by small vibration of the entire test rig (due to the test velocity exceeding the design arm speed) and not due to vibration of the cylinder itself (subsequent tests have revealed that smooth cylinders can virtually eliminate VIV at Reynolds numbers much higher than those that were achieved herein).

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

All references cited in the present application, including journal articles, and U.S. and foreign patents and patent applications, are incorporated herein by reference.

We claim:

1. A system for reducing the effects of drag and vortex-induced vibration, comprising:
   (a) a substantially cylindrical marine element comprising a top, a bottom, and a circumference; and
   (b) a substantially cylindrical sleeve that fits around the element and covers from about 180 degrees to about 360 degrees of the circumference of the marine element,
   wherein the sleeve comprises a top, a bottom, a length, an interior surface and an exterior surface,
   wherein the exterior surface has a roughness due to peaks and troughs on the exterior surface,
   wherein the roughness is quantifiable as a roughness parameter K/D,
   wherein said exterior surface has been treated to provide a K/D value of about $5.0 \times 10^{-5}$ or less, and
   wherein K is an averaged value of the distance between the peaks and troughs on the exterior surface, and D is the outer diameter of the sleeve covering the marine element.

2. The system of claim 1 wherein the cylindrical marine element is selected from the group consisting of subsea pipelines, drilling risers, production risers, import and export risers, tendons for tension leg platforms, legs for traditional fixed and for compliant platforms, space-frame members for platforms, cables, umbilicals, mooring elements for deepwater platforms, hull structures for tension leg platforms (TLPs) and for spar type structures, and column structures for tension leg platforms (TLPs) and for spar type structures.

3. The system of claim 2 wherein the sleeve is secured in place around the circumference of the element.

4. The system of claim 3 wherein the sleeve comprises two members that are hinged to one another to form a clam-shell structure having a hinged edge and two unhinged edges.

5. The system of claim 3 wherein the sleeve comprises two members that are connected to one another after being positioned around the circumference of the marine element.

6. The system of claim 1 wherein friction-reducing devices are attached to the interior surface of the sleeve.

7. A method of installing an ultra-smooth sleeve around a substantially cylindrical marine element, the method comprising the steps of:
   (a) positioning a sleeve having a top, a bottom, an interior surface and an exterior surface, around a cylindrical element having a top, a bottom, a length, and a circumference, wherein the sleeve covers from about 180 degrees to about 360 degrees of the circumference of the element; and
   (b) securing the sleeve in position around the circumference of the element,
   wherein the exterior surface of the sleeve has a roughness due to peaks and troughs on the exterior surface,
   wherein the roughness is quantifiable as a roughness parameter K/Dc
   wherein said exterior surface has been treated to provide a K/D value of about $5.0 \times 10^{-5}$ or less, and
   wherein K is an averaged value of the distance between the peaks and troughs on the exterior surface, and D is the outer diameter of the sleeve covering the marine element.

8. The method of claim 7 wherein the sleeve comprises two members, and wherein the step of securing the sleeve in position around the element comprises connecting the two members to one another.

9. The method of claim 7 wherein the sleeve comprises at least two members hinged to one another to form a clam-shell structure having a hinged edge and two unhinged edges, and wherein the step of positioning the sleeve comprises opening the clam shell structure, placing the structure around the circumference of the element, and closing the clam-shell structure around the circumference of the element.

10. The method of claim 9 wherein the step of securing the sleeve comprises connecting the two unhinged edges of the clam shell structure to one another.

11. The method of claim 7 wherein the sleeve comprises at least a first and second sleeve, wherein the first and second sleeves each comprise a top and a bottom, wherein the first and second sleeves are stacked on top of each other so the top of the second sleeve is in contact with the bottom of the first sleeve, and wherein the bottom of the first sleeve is connected to the top of the second sleeve.

12. The method of claim 7 wherein the step of positioning the sleeve comprises placing the bottom of the sleeve directly over the top of the marine element, and sliding the sleeve down the element so the sleeve covers the circumference of the element.

13. The method of claim 12 wherein friction-reducing devices are attached to the interior surface of the sleeve.

14. The method of claim 7 wherein the cylindrical marine element is selected from the group consisting of subsea pipelines, drilling risers, production risers, import and export risers, tendons for tension leg platforms, legs for traditional fixed and for compliant platforms, space-frame members for platforms, cables, umbilicals, mooring elements for deepwater platforms, hull structures for tension leg platforms (TLPs) and for spar type structures, and column structures for tension leg platforms (TLPs) and for spar type structures.

15. The method of claim 7 further comprising the step of:

(c) placing a collar around the element wherein the collar covers from about 180 degrees to about 360 degrees of the circumference of the marine element, wherein the collar is placed above or below the sleeve, and wherein the sleeve is prevented from moving along the length of the element beyond the collar.

16. The method of claim 15 wherein step (c) is performed before step (a), and step (a) is performed before step (b).

17. The method of claim 7 further comprising the step of:

(c) modifying the buoyancy of the sleeve.

18. The method of claim 17 wherein the step of modifying buoyancy comprises attaching a weight or a buoyancy module to the sleeve.

19. The method of claim 7 further comprising the steps of:

(c) positioning a second sleeve having a top and a bottom around the circumference of the element, wherein the second sleeve covers from about 180 degrees to about 360 degrees of the circumference of the element, and (d) securing the second sleeve in position around the element, wherein the first and second sleeves are stacked relative one another.

20. The method of claim 19 wherein the exterior surface of the second sleeve has a roughness due to peaks and troughs on the exterior surface, wherein the roughness of the exterior surface of the second sleeve is quantifiable as a roughness parameter $K_2/D_2$ and has a value of about $1.0 \times 10^{-4}$ or less, wherein $K_2$ is an averaged value of the distance between the peaks and troughs on the exterior surface of the second sleeve, and $D_2$ is the outer diameter of the second sleeve covering the marine element.

* * * * *